United States

Thiel

[11] 3,901,581

[45] Aug. 26, 1975

[54] TAPERED COUPLER FOR OPTICAL COMMUNICATION SYSTEM

[75] Inventor: Frank L. Thiel, Painted Post, N.Y.

[73] Assignee: Corning Glass Works, Corning, N.Y.

[22] Filed: July 5, 1973

[21] Appl. No.: 376,580

[52] U.S. Cl. ......... 350/96 C; 350/96 B; 350/96 WG
[51] Int. Cl.² ........................................... G02B 5/14
[58] Field of Search........... 350/96 R, 96 B, 96 WG; 250/199

[56] References Cited
UNITED STATES PATENTS

| | | | |
|---|---|---|---|
| 3,455,625 | 7/1969 | Brumley et al. ................. | 350/169 X |
| 3,610,755 | 10/1971 | Wieberger et al. ...... | 350/96 WG UX |
| 3,751,670 | 8/1973 | Grodner et al. ..................... | 250/199 |
| 3,756,688 | 9/1973 | Hudson et al. ................. | 350/96 WG |

FOREIGN PATENTS OR APPLICATIONS

| | | | |
|---|---|---|---|
| 1,017,354 | 1/1966 | United Kingdom........... | 350/96 WG |

*Primary Examiner*—John K. Corbin
*Attorney, Agent, or Firm*—William J. Simmons, Jr.; Walter S. Zebrowski; Clarence R. Patty, Jr.

[57] ABSTRACT

An optical signal coupler for use between a single optical signal transmission line and a plurality of such transmission lines. The coupler comprises an elongated conically shaped rod of transparent material having large and small substantially parallel endfaces. Support means disposes the ends of the plurality of transmission lines in a bundled arrangement in such a manner that the optical waveguides of which the transmission lines are comprised terminate adjacent to the large endface of the rod, the axes of the waveguides being substantially parallel to the longitudinal axis of the rod. The single transmission line is disposed in a similar manner at the small endface of the rod.

7 Claims, 2 Drawing Figures

TAPERED COUPLER FOR OPTICAL COMMUNICATION SYSTEM

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media required in the transmission of frequencies around $10^{15}$ Hz are hereinafter referred to as optical signal transmission lines or merely transmission lines which may consist of a single optical waveguide or a bundle thereof. Optical waveguides normally consist of an optical fiber having a transparent core having a refractive index $n_1$ surrounded by a layer of transparent cladding material having a refractive index $n_2$ which is lower than $n_1$. Although the theory of optical waveguides has been known for some time, practical optical waveguides that do not absorb an excessive amount of transmitted light have been developed only recently. For example, U.S. Pat. No. 3,659,915 discloses a low loss optical waveguide comprising a cladding layer of fused silica and a core of fused silica doped with one or more materials that selectively increase the index of refraction of the core above that of the cladding.

To establish an optical communication network between a controlling station or central processing unit (CPU) and a plurality of subscriber stations, a variety of interconnection schemes may be utilized. The CPU can be "hard wired" to the subscriber stations, but when many subscriber stations exist, the excessive amount of optical signal transmission line required causes this method to be undesirable due to both the cost of the transmission line and the space consumed thereby. A loop data bus may be employed, thereby drastically reducing the required amount of optical signal transmission line, but the large number of couplers required in such a system introduces an excessive amount of loss, especially in those systems in which there are many subscriber stations.

The optical communication network disclosed in copending patent application Ser. No. 376,575 entitled "Optical Communication System" filed by R. E. Love et al. on July 5, 1973 and assigned to the assignee of the present application; takes advantage of unique properties of optical signal transmission lines and enables the interconnection of a plurality of stations with much less transmission line than that which would be required by hard wiring, and yet it is not plagued by the excessive losses encountered in the aforementioned loop data bus. In accordance with the invention disclosed in that application, a plurality of stations, including the CPU, are connected by separate transmission lines to a common passive coupler which is adapted to receive an optical signal from any one of the stations and couple a portion of that signal to the transmission line associated with each of the other stations. Each of the stations comprises means for generating optical signals and means for receiving optical signals. Although this network efficiently interconnects all of the stations associated therewith, it is important in certain applications to ensure that the CPU has access to all subscriber stations and that the subscriber stations each have access to the CPU but not to each other.

SUMMARY OF THE INVENTION

Briefly, the present invention relates to a coupler for use in an optical communication system having a plurality of optical signal transmission lines which are to communicate with one other optical signal transmission line. Each of these transmission lines comprises at least one optical waveguide having a core of transparent material surrounded by a layer of transparent cladding material having a refractive index lower than that of the core. The coupler of the present invention, which couples optical signals between the plurality of transmission lines and the one transmission line, comprises an elongated, tapered rod of transparent material having large and small substantially parallel endfaces that are substantially perpendicular to the axis thereof. Means surrounding the rod forms with the surface thereof a light reflecting interface. First support means disposes the ends of a plurality of transmission lines in a bundled, parallel arrangement, the optical waveguides of which the transmission lines are comprised terminating in faces that are disposed adjacent to the large endface. The planar array in which the faces are disposed is substantially parallel to the large endface. Second support means disposes the end of the one transmission line adjacent to the small endface so that the axis of that transmission line is substantially parallel to that of the rod.

As used herein "transparent" indicates transparency to those wavelengths of light that are propagated by the associated optical signal transmission lines.

DESCRIPTION OF THE PREFERRED EMBODIMENT

Figure 1:
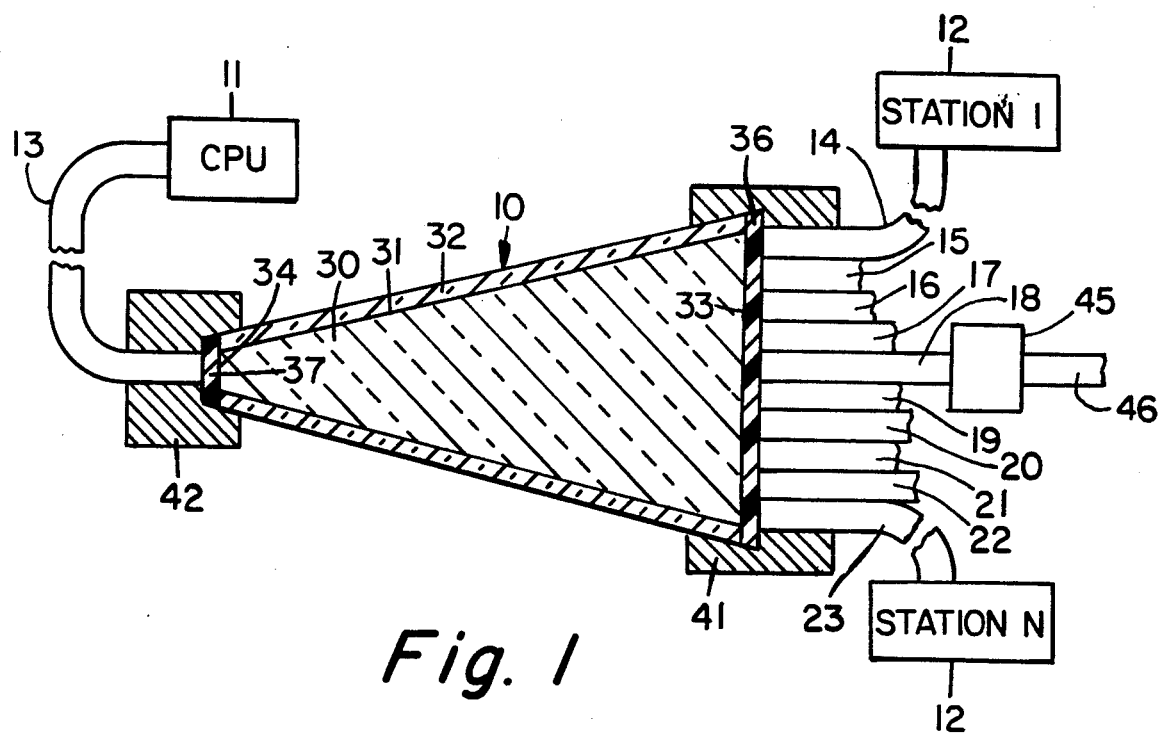
FIG. 1 is a schematic illustration in block diagram form of the optical system of the present invention.

FIG. 1 illustrates an optical communication system wherein a central processing unit 11 is connected by coupler 10 to a plurality of subscriber stations 12. For the sake of simplicity, only stations 1 and N are illustrated. An optical signal transmission line 13 connects unit 11 to the coupler, and the coupler is connected to the subscriber stations by transmission lines 14 through 23.

Coupler 10 consists of an elongated tapered rod 30 of transparent material, the refractive index $n_3$ of which is preferably the same as that of the cores of the optical wave-guides employed in the optical signal transmission lines 13 through 23. Rod 30 is preferably in the shape of a truncated cone, but other suitable cross-sectional shapes may be employed. If optical waveguides such as those disclosed in the aforementioned U.S. Pat. No. 3,659,915 were utilized in the optical signal transmission lines associated with coupler 10, rod 30 would consist of doped fused silica having a refractive index equal to that of the waveguide cores, or it could consist of some other glass having a similar refractive index. The outer surface of rod 30 should cooperate with the surrounding medium to provide an optical quality interface 31 for reflecting back into the rod any light that is incident thereon. Such an interface is preferably provided by layer 32 of transparent cladding material having a refractive index $n_4$ sufficiently lower than that of rod 30. Interface 31 could also be provided by polishing the surface of rod 30 and utilizing air as the low index surrounding medium or by disposing on the surface of rod 30 a dielectric or metallic layer which is reflective to the wavelengths of light transmitted by the optical signal transmission lines. The difference between the refractive indices of the core and cladding material of coupler 10 should be greater than the difference between the refractive indices of the core and cladding material of the optical waveguides of which transmission lines 13 through 23 are comprised; this difference should be great enough that the extreme rays of light radiating from transmission lines 14 through 23 which are incident upon interface 31 reflect from that interface.

Endfaces 33 and 34 of rod 30 are polished and are substantially perpendicular to the longitudinal axis of the rod. Endfaces 33 and 34 may be provided with layers 36 and 37, respectively, of index matching fluid to prevent Fresnel reflections. The absence of such antireflection means could cause the undesirable coupling of optical signals between transmission lines 14 through 23. The end portions of transmission lines 14 through 23 are groupd and maintained in parallel alignment, the ends thereof lying in a plane that is substantially perpendicular to the axes of the end portions. The ends of the optical waveguides of which the transmission lines are comprised may be ground and polished so that each waveguide terminates in a face that is substantially perpendicular to the axis thereof; however, the waveguide faces need not be polished and oriented perpendicular to their axes if layers 36 and 37 of index matching fluid are employed. The jackets of the transmission lines may be removed from the ends of the transmission lines which are connected to the coupler. Support means 41 maintains transmission lines 14 through 23 in alignment with rod 30 so that the ends of the transmission lines are disposed within a region defined by the circumference of endface 33. Support means 41 also maintains the longitudinal axis of the end portion of each transmission line substantially parallel to that of rod 30. Support means 42 positions the end of transmission line 13 in the center of endface 34 and aligns the axis of the end portion thereof with that of rod 30.

Each of the transmission lines 13 through 23 could consist of a short length of transmission line, the end thereof opposite the coupler terminating in an optical connector. For the sake of simplicity, only transmission line 18 is illustrated as being of relatively short length and terminating at connector 45. Connector 45 may be of the type disclosed in U.S. patent application Ser. No. 376,577 entitled "Optical Waveguide Connector" filed on July 5, 1973 and assigned to the assignee of the present application, now U.S. Pat. No. 3,846,010. This construction permits the coupler to be constructed in a factory under controlled conditions whereby the optical signal transmission lines can be properly positioned and aligned with respect to the ends of the coupler. Installation of the coupler then merely requires the connection of the transmission line from a remote station to its respective coupler. For example, transmission line 46 which extends from a remote subscriber station would be connected to connector 45. Since connectors 45 introduce loss into the system, it may be preferably to connect and align transmission lines 14 through 23 directly to the ends of the coupler 10 at the time of its installation into the system.

The function of coupler 10 is to couple optical signals from the CPU 11 to all of the subscriber stations 12 and to couple optical signals from the subscriber stations to the CPU. Optical signals from any one of the subscriber stations must not be coupled to the other subscriber stations. This permits each subscriber to conduct confidential information exchange with the CPU without indiscriminately reaching other subscribers. Of course, a subscriber could reach one or more of the other subscribers that share a central coupler by first contacting the CPU which then relays the information to the other subscriber stations.

Figure 2:
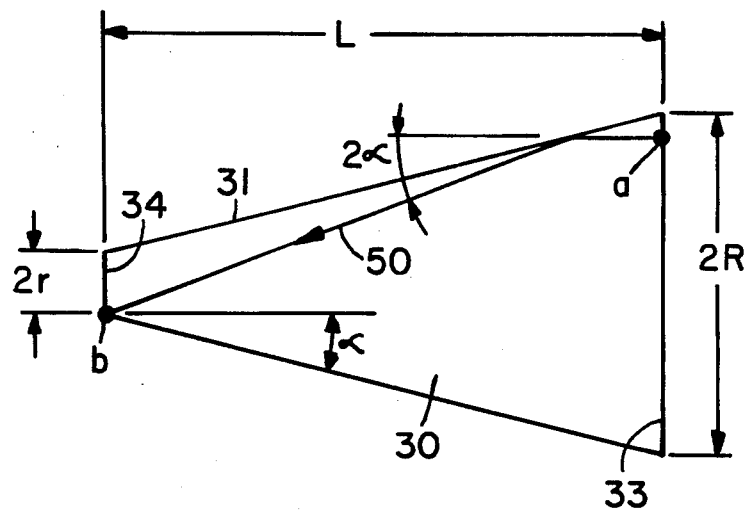
FIG. 2 is a diagram useful for calculating the minimum length of the coupler of the present invention.

Reference is made to FIG. 2 which shows a diagram that is useful in the calculation of the minimum length $L_m$ of rod 30. The radii R and r of endfaces 33 and 34, respectively, are determined by the diameter of the bundle of transmission lines 14 through 23 and by the diameter of transmission line 13. Light from endface 33 reflecting from interface 31 has its angle with respect to the axis of rod 30 increased by $2\alpha$ where $\alpha$ is the taper angle of rod 30. From the diagram in FIG. 2 it can be seen that the maximum taper angle $\alpha_m$ must be $\theta_c/2$ in order to insure that light entering endface 33 parallel to the axis of rod 30 is within the acceptance angle of the optical waveguide fibers at endface 34, where $\theta_c$ is the acceptance half angle of the optical waveguides which comprise the optical signal transmission lines and is given by the equation $$\theta_c = \sin^{-1} \frac{\sqrt{n_1^2 - n_2^2}}{n_3}$$

Thus, a light ray 50 radiated parallel to the axis of rod 30 from a waveguide at point $a$ on endface 33 reflects from interface 31 and is within the acceptance angle $\theta_c$ of a waveguide at point $b$ on endface 34, if the taper angle $\alpha$ is no greater than $\theta_c/2$.

The length L of rod 30, from geometric considerations, can be given as $$L = \frac{R-r}{\tan \alpha}$$

and hence the minimum length can be expressed as $$L_m = \frac{R-r}{\tan(\theta_c/2)}$$

During operation, light from transmission line 13 spreads upon entering rod 30 and illuminates all of the transmission line faces disposed at endface 33. Depending upon the length of rod 30 and the taper angle thereof, some of the light radiated from transmission line 13 may reflect from interface 31 before impinging upon the ends of transmission lines 14 through 23. Light radiating from each of the transmission lines 14 through 23 reaches the end of transmission line 13 by direct radiation as well as by reflection from interface 31. Depending upon the taper angle and the number of reflections which occur at interface 31, some of this light will be outside the acceptance angle of the optical waveguides of transmission line 13 and will be lost. Thus, coupler 10 couples optical signals from the CPU to all of the subscriber stations, and an optical signal from a subscriber station is coupled to the CPU; however, this subscriber signal does not reflect and couple to the other subscriber stations due to index matching means 37.

I claim:

1. In an optical communication system having a first plurality of optical signal transmission lines which are to communicate with a first optical signal transmission line, wherein each of said transmission lines comprises at least one optical waveguide having a core of transparent material having a refractive index $n_1$ surrounded by a layer of transparent cladding material having a refractive index $n_2$ that is lower than $n_1$, a coupler for coupling different optical signals between each of said first plurality of transmission lines and said first transmission line, said coupler comprising an elongated rod in the shape of a truncated cone, said rod having large and small substantially parallel, planar, circularly shaped endfaces that are substantially perpendicular to the axis thereof, said rod consisting of transparent material having a refractive index $n_3$ that is substantially equal to $n_1$, a layer of transparent cladding material disposed upon the surface of said rod and forming with the surface thereof a light reflecting interface, the refractive index $n_4$ of said cladding material being lower than $n_3$, means at said small endface for preventing light from said rod from reflecting from said small endface back into said rod, first support means for disposing the end portions of said first plurality of transmission lines in a bundled, parallel arrangement, the optical wave-guides of which said transmission lines are comprised terminating in faces that are disposed adjacent to said large endface, said faces being disposed in a planar array that is substantially parallel to said large endface, said waveguide faces being circumscribed by a circle of radius R, the diameter of said first transmission line being r, the minimum length $L_m$ of said rod being defined by the equation $$L \geq \frac{R + r}{\tan(\theta_c/2)}$$

wherein $\theta_c$ is the acceptance half angle of said at least one optical waveguide, and second support means for disposing the end portion of said first transmission line adjacent to said small endface, the axis of said first transmission line being substantially parallel to that of said rod.

2. An optical communication system in accordance with claim 1 wherein the maximum taper angle of said rod is $\theta_c/2$.

3. An optical communication system in accordance with claim 2 wherein the ends of each of said first plurality of said transmission lines and the end of said first transmission line which are remote from said coupler terminate at optical signal coupling means.

4. An optical communication system in accordance with claim 3 further comprising a plurality of stations equal in number to one plus the number of said first plurality of transmission lines, a second plurality of optical signal transmission lines equal in number to the number of said stations, each of said stations being connected by one of said second plurality of transmission lines to a respective one of said coupling means each of said stations including means for generating optical signals and means for receiving optical signals.

5. In an optical communication system having a coupler for connecting optical signals from a first station to a plurality of stations and connecting optical signals from said plurality of stations to said first station but preventing the interconnection of optical signals from one of said plurality of stations to another of said plurality of stations, wherein said first station and said plurality of stations each includes means for generating an optical signal and means for receiving an optical signal, a first optical signal transmission line for connecting said first station to said coupler and a plurality of optical signal transmission lines, one of which connects each of said plurality of stations to said coupler, wherein each of said transmission lines comprises at least one optical waveguide having a core of transparent material having a refractive index $n_1$ surrounded by a layer of transparent cladding material having a refractive index $n_2$ that is lower than $n_1$, said coupler being characterized in that it comprises an elongated, tapered rod of transparent material having large and small substantially parallel planar endfaces that are substantially perpendicular to the axis thereof, means at said small endface for preventing light from said rod from reflecting from said small endface back into said rod, means surrounding said rod for forming with the surface thereof a light reflecting interface, first support means for disposing the end portions of said plurality of transmission lines in a bundled, parallel arrangement, the optical waveguides of which said transmission lines are comprised terminating in faces that are disposed adjacent to said large endface, said faces being disposed in a planar array that is substantially parallel to said large endface, and second support means for disposing the end portion of said first transmission line adjacent to said small endface, the axis of said first transmission line being substantially parallel to that of said rod.

6. An optical communication system in accordance with claim 5 wherein said rod is in the shape of a truncated cone and said large and small endfaces are circular, and wherein said plurality of transmission lines are grouped into a bundle, the cross-section of which is circumscribed by a circle of radius R, the diameter of said first transmission line being r, the minimum length $L_m$ of said rod being defined by the equation $$L \geq \frac{R + r}{\tan(\theta_c/2)}$$

wherein $\theta_c$ is the acceptance half angle of said at least one optical waveguide.

7. An optical communication system in accordance with claim 6 wherein the maximum taper angle of said rod is $\theta_c/2$.

* * * * *